ROBERTS & BADGER.
Hop-Vine Support.

No. 66,393.

Patented July 2, 1867.

Witnesses:
Thos Tusche
Wm Truren

Inventor:
J. C. Roberts
E. W. Badger
Per
attorneys

United States Patent Office.

NORMAN C. ROBERTS AND EZRA W. BADGER, OF FLY CREEK, NEW YORK.

Letters Patent No. 66,393, dated July 2, 1867.

IMPROVEMENT IN DEVICE FOR SUPPORTING HOP-VINES.

The Schedule referred to in these Letters Patent and making part of the same.

TO ALL WHOM IT MAY CONCERN:

Be it known that we, NORMAN C. ROBERTS and EZRA W. BADGER, of Fly Creek, in the county of Otsego, and State of New York, have invented a new and improved Device for Supporting Hop-Poles; and we do hereby declare that the following is a full, clear, and exact description thereof, which will enable others skilled in the art to make and use the same, reference being had to the accompanying drawings, forming part of this specification.

This invention consists in providing, for hop-poles, a chain and ring formed of wire or any other suitable material; the rings being placed over the tops of the poles and forming a part of the chain, which is drawn over each row of hills to support the tops of the poles to prevent them from swinging in the wind, as well as to keep them separated and in their proper positions. The advantages gained by our device over the ordinary method of securing hop-poles are these, viz: Small poles may be used that are not of sufficient strength at the base to support themselves when loaded with the vine and crop, nor to withstand the wind and storm. Refuse timber may be rendered sufficiently strong by the application of this device which could not be used without it, thus materially lessening the cost of vine-supporters. The poles do not require to be set so deep in the ground as in ordinary cases, in consequence of the support at the top, which is a great advantage, as the hole left when the pole is removed is not deep enough to reach the roots of the vine, whereas poles set in the usual way, deep in the ground, when withdrawn, have a hole which reaches the root, fills with water which freezes in winter, and frequently kills the vine.

Similar letters of reference indicate like parts.

Figure 1:
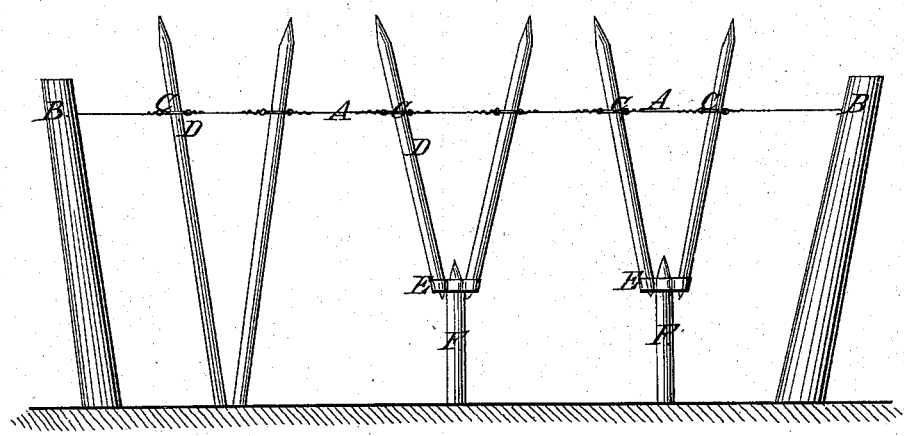
Figure 1 represents a longitudinal elevation of the poles with our device attached.
Figure 2:
Figure 2 represents a top view.

A represents the chain which is fastened to the first and last stationary posts B of the row of hills. C represents the rings encircling the poles D and attached to the chain A. E is a band encircling the poles F, provided with two rings to receive the bottom ends of the poles D, showing a second arrangement of our device for accomplishing the same object.

Having thus described our invention, what we claim as new, and desire to secure by Letters Patent, is—

The chain A, secured to the post B, provided with rings C, encircling the bearing-poles D, in the manner and for the purpose represented and described.

NORMAN C. ROBERTS,
EZRA W. BADGER.

Witnesses:
GEORGE BROOKS,
J. RUSSEL POTTER.